July 3, 1928.
J. A. STEIN
BELT TENSIONING DEVICE
Filed March 26, 1926
1,675,671
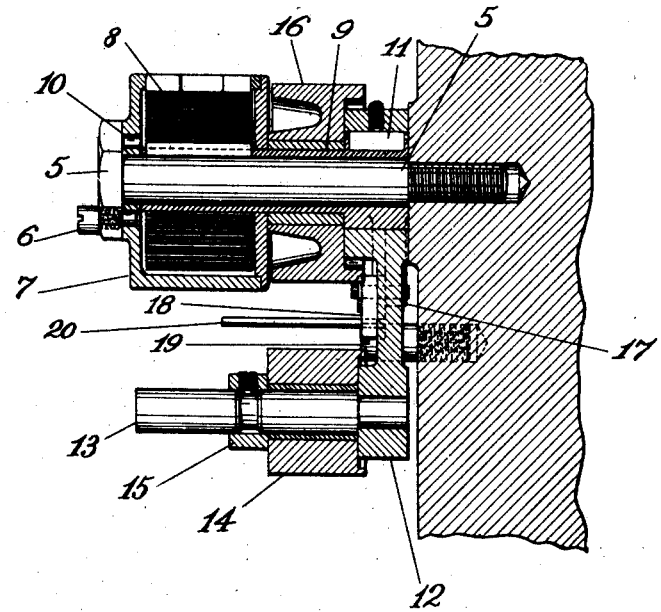
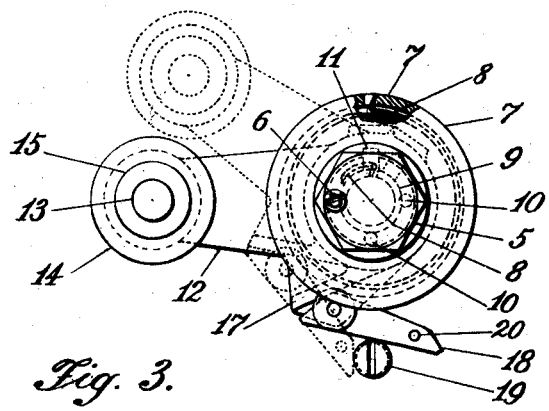
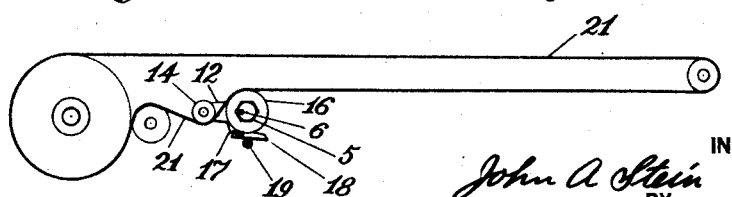
INVENTOR
John A. Stein
BY
Sydney Prescott
ATTORNEY Patented July 3, 1928.

1,675,671

UNITED STATES PATENT OFFICE.

JOHN A. STEIN, OF NEW YORK, N. Y., ASSIGNOR TO AMERICAN MACHINE & FOUNDRY COMPANY, A CORPORATION OF NEW JERSEY.

BELT-TENSIONING DEVICE.

Application filed March 26, 1926. Serial No. 97,512.

This invention relates to an improvement in a belt tensioning device, particularly adapted for use in connection with endless belts such as those used in certain classes of machinery including cigarette machines, textile machinery, etc., in which the degree of tension is of prime importance; and the main object of the invention is the production of a device so constructed that the tension is not only readily adjustable, but after once being adjusted to the proper degree, it can be temporarily released for any desired manipulation of the belt without disturbing the adjustment. A further object is the production of such a device of a simple and efficient construction so that it may be easily installed and readily manipulated. With these and other objects not specifically mentioned in view, the invention consists in certain constructions and combinations which will be hereinafter fully described and then specifically set forth in the claims hereunto appended.

In the accompanying drawings, in which like characters of reference indicate the same or like parts, Fig. 1 is a sectional side elevation of a device constructed in accordance with the invention; Fig. 2 is a front view of the device shown in Fig. 1, showing the relative position of the working parts with the tension arm in and out of engaging position; and Fig. 3 is a diagram showing the application of the device of Figs. 1 and 2 to an endles belt, as that of a cigarette machine.

Generally speaking, the device consists of a stationary housing enclosing a flat coil spring adjustably connecting it with a loose sleeve to which is keyed an arm carrying an idle pulley over which the belt runs, the tension arm being provided with tripping means which holds the tension idler off the belt when lifted out of engagement therewith.

Referring to the drawings, 5 indicates the stationary post screwed into the frame of the machine in connection with which the device is used. To the head of this post, by means of a set screw 6, is attached a housing 7 enclosing a flat coil spring 8. One end of the latter is attached to the housing 7, and the other end is attached to a sleeve 9 rotatable on the post 5 and extending beyond the housing 7. The housing head is provided with a circular series of equi-distant holes 10, either one of which may be engaged by the set screw 6, so that the housing 7 can be set at any desired angle and thereby adjust the spring 8 to any desired tension.

To the sleeve 9 is fastened, by means of a key 11, an arm 12, which carries a stud 13 supporting an idle pulley 14, the latter being held in place by means of a set collar 15. Between the housing 7 and the arm 12, another idle pulley 16 is journaled on the sleeve 9.

The arm 12 is provided with a lug 17 on which is pivoted a pawl 18, engaging a stationary stop screw 19, threaded into the frame of the machine in connection with which the device is used. The pawl 18 has a handle 20 for resetting it after being tripped.

In applying the device, the belt 21 to be tensioned is run over the idler 16 and under the idler 14 in the manner shown in Fig. 3, and the tension spring 8 is adjusted by turning the housing 7 and locking it to the post 5 by means of the engagement of the set screw 6 with one of the holes 10.

By seizing the projecting end of the stud 13 and swinging the arm 12, thus pulling the idle pulley 14 off the belt, the end of the pawl 18 will be caused to engage the stop screw 19, as shown in the dotted lines in Fig. 2. This will release the tension on the belt without changing the adjustment of the spring 8, so that by manipulating the handle 20 to re-set the pawl 18 and re-engage the idler 14 with the belt, the correct tension will be again applied to the belt.

What is claimed is:

1. A belt tensioning device comprising a post, an idle pulley rotatable about said post and adapted to under-run a belt to be tensioned, an arm swingable about said post, an idle pulley carried by said arm and adapted to overrun said belt, and spring-actuated means surrounding said post for causing said arm to swing, said means including a sleeve rotatable on said post and fast to said arm, a spring one end of which is secured to said sleeve, and an adjustable stationary member to which the other end of said spring is secured.

2. A belt tensioning device comprising a post, an idle pulley rotatable about said post and adapted to under-run a belt to be tensioned, an arm swingable about said post, an idle pulley carried by said arm and adapted to over-run said belt, and spring-actuated means surrounding said post for causing said arm to swing, said means including a sleeve rotatable on said post and fast to said arm, a spring one end of which is secured to said sleeve, and an adjustable stationary housing inclosing said spring and to which the other end of said spring is fast.

3. A belt tensioning device comprising a post, an idle pulley rotatable about said post and adapted to under-run a belt to be tensioned, an arm swingable about said post, an idle pulley carried by said arm and adapted to over-run said belt, and spring-actuated means surrounding said post for causing said arm to swing, said means including a sleeve rotatable on said post and fast to said arm, a spring one end of which is secured to said sleeve, and a housing enclosing and fast to one end of said spring and having a plurality of holes in its head, and a set screw carried by said post and engaging one of said holes.

4. A belt tensioning device comprising a post, an idle pulley rotatable about said post and adapted to under-run a belt to be tensioned, an arm swingable about said post, an idle pulley carried by said arm and adapted to over-run said belt, spring-actuated means surrounding said post for causing said arm to swing, and a trip mechanism for temporarily holding said arm in inoperative position.

5. A belt tensioning device comprising a post, an idle pulley rotatable about said post and adapted to under-run a belt to be tensioned, an arm swingable about said post, an idle pulley carried by said arm and adapted to over-run said belt, spring-actuated means surrounding said post for causing said arm to swing, and a trip mechanism for temporarily holding said arm in inoperative position and including a stationary stop screw and a pawl pivoted to said arm and engaging said stop screw.

In testimony whereof, I have signed my name to this specification.

JOHN A. STEIN.